United States Patent
Wrzesinski et al.

(10) Patent No.: US 11,898,620 B2
(45) Date of Patent: Feb. 13, 2024

(54) HYDRAULIC DAMPER WITH PISTON ASSEMBLY HAVING BLOW-OFF VALVES

(71) Applicant: BeijingWest Industries Co., Ltd., Beijing (CN)

(72) Inventors: Jakub Wrzesinski, Cracow (PL); Pawel Slusarczyk, Myslenice (PL); Bartlomiej Franczyk, Cracow (PL)

(73) Assignee: BEIJINGWEST INDUSTRIES CO., LTD, Beijing (CN)

( * ) Notice: Subject to any disclaimer, the term of this patent is extended or adjusted under 35 U.S.C. 154(b) by 27 days.

(21) Appl. No.: 17/670,456

(22) Filed: Feb. 12, 2022

(65) Prior Publication Data

US 2022/0325773 A1 Oct. 13, 2022

(30) Foreign Application Priority Data

Apr. 12, 2021 (CN) .......................... 202110388034.2

(51) Int. Cl.
| | |
|---|---|
| *F16F 9/348* | (2006.01) |
| *F16F 9/10* | (2006.01) |
| *F16F 9/32* | (2006.01) |

(52) U.S. Cl.
CPC ................ *F16F 9/348* (2013.01); *F16F 9/10* (2013.01); *F16F 9/3214* (2013.01)

(58) Field of Classification Search
CPC ........................................................ F16F 9/10
See application file for complete search history.

(56) References Cited

U.S. PATENT DOCUMENTS

| | | |
|---|---|---|
| 5,823,306 A | 10/1998 | de Molina |
| 8,245,823 B2 | 8/2012 | Zeissner et al. |

(Continued)

FOREIGN PATENT DOCUMENTS

| | | |
|---|---|---|
| EP | 0632212 A2 | 1/1995 |
| EP | 1172580 A1 | 1/2002 |

(Continued)

OTHER PUBLICATIONS

Extended European Search Report dated Sep. 21, 2022 for counterpart European patent application No. 22167580.4.

*Primary Examiner* — Melody M Burch
(74) *Attorney, Agent, or Firm* — William H. Honaker; Dickinson Wright PLLC

(57) ABSTRACT

The present invention relates to a hydraulic damper comprising a tube and a piston assembly provided with rebound valve assemblies and compression valve assemblies, wherein each valve assembly comprises a deflectable-disc valve and a blow-off valve. The piston assembly comprises two sleeve-shaped members each provided with a plurality of blow-off valve flow passages, a plurality of deflectable-disc valve flow passages, and a central opening, wherein the piston rod passes through said central openings to secure the piston assembly, a plurality of deflectable disc(s) of the deflectable-disc valve cover(s) said deflectable-disc valve flow passages, wherein a plurality of disc(s) of the blow-off valve adjoin(s) said blow-off valve flow passages, wherein the piston assembly further comprises two spring seats abutting said disc(s) of the blow-off valve, and at least one spring disposed within said internal chamber that biases said spring seats towards said number of discBP-S20010US(s).

14 Claims, 7 Drawing Sheets

(56) References Cited

U.S. PATENT DOCUMENTS

| | | |
|---|---|---|
| 9,631,695 B2 | 4/2017 | De Kock |
| 2002/0096408 A1 | 7/2002 | Moradmand et al. |
| 2005/0183911 A1 | 8/2005 | Wilda et al. |
| 2007/0074198 A1 | 3/2007 | Gassoway et al. |
| 2011/0031077 A1 | 2/2011 | Slusarczyk et al. |
| 2018/0202507 A1 | 7/2018 | Kim |
| 2018/0223941 A1* | 8/2018 | Grzesik .................. F16F 9/483 |
| 2018/0306266 A1* | 10/2018 | Knapczyk ............. F16F 9/3481 |

FOREIGN PATENT DOCUMENTS

| | | | |
|---|---|---|---|
| FR | 2959289 A1 | 10/2011 | |
| GB | 2314602 A | 1/1998 | |
| JP | 541763 A | 1/1979 | |
| KR | 20130139491 A | 12/2013 | |
| WO | 2005026572 A1 | 3/2005 | |
| WO | WO-2013159276 A1 * | 10/2013 | .............. F16F 9/348 |

\* cited by examiner

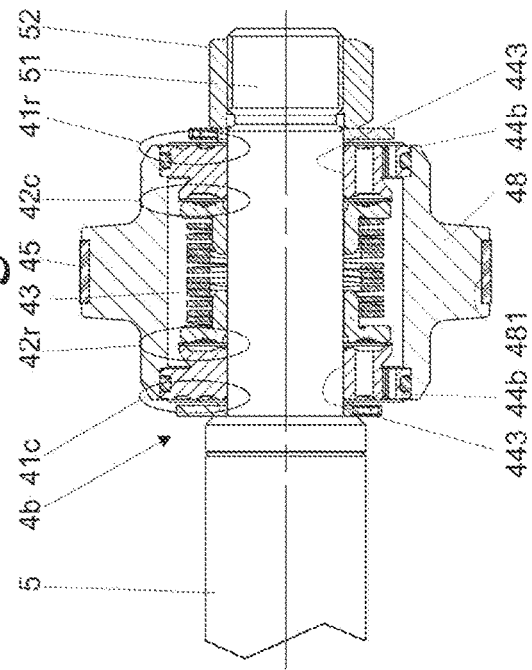
Fig.4a Fig.4b
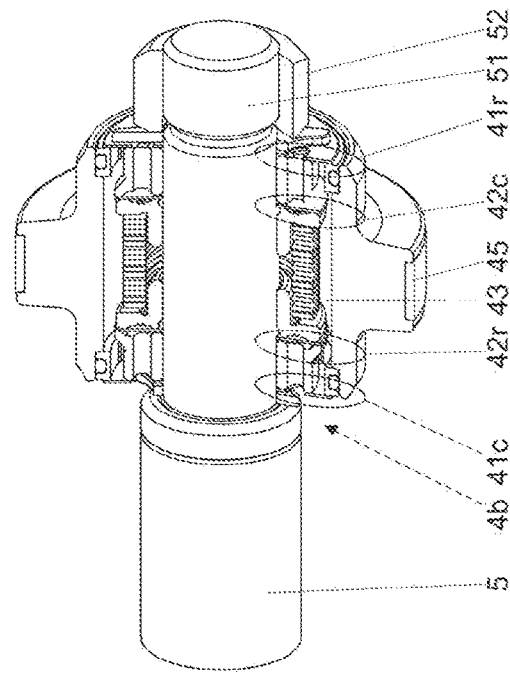
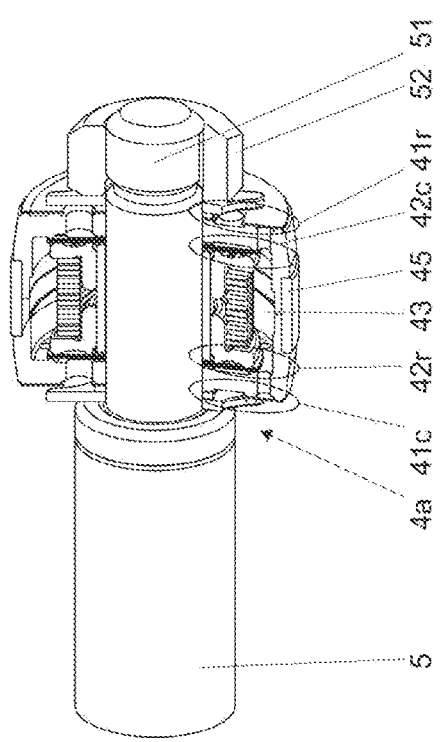
Fig.3a Fig.3b
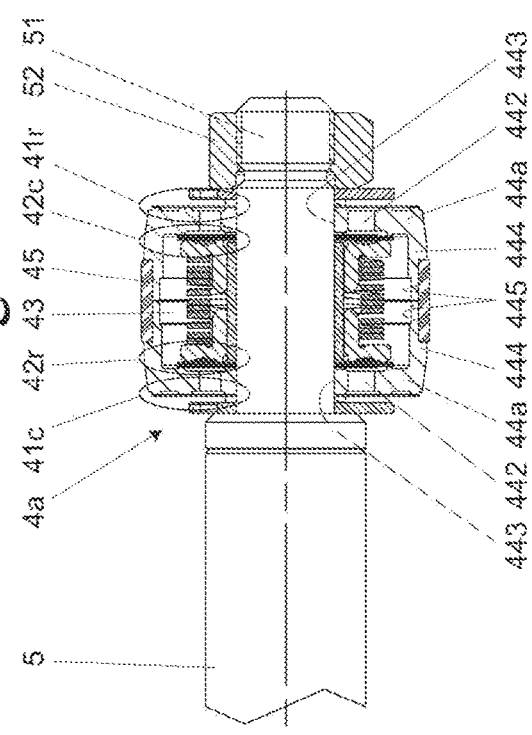

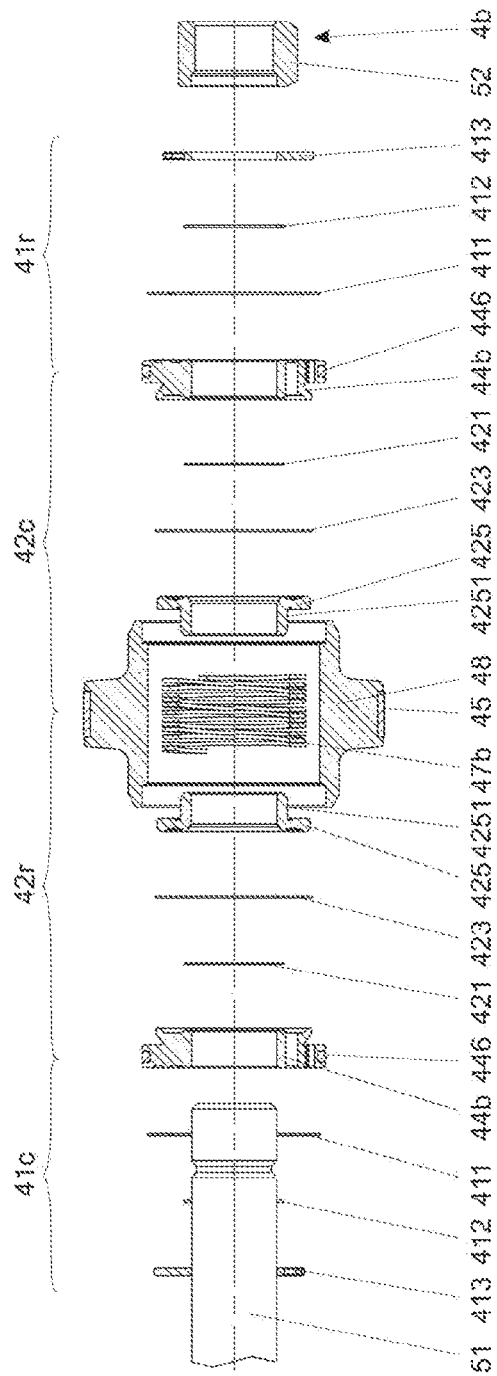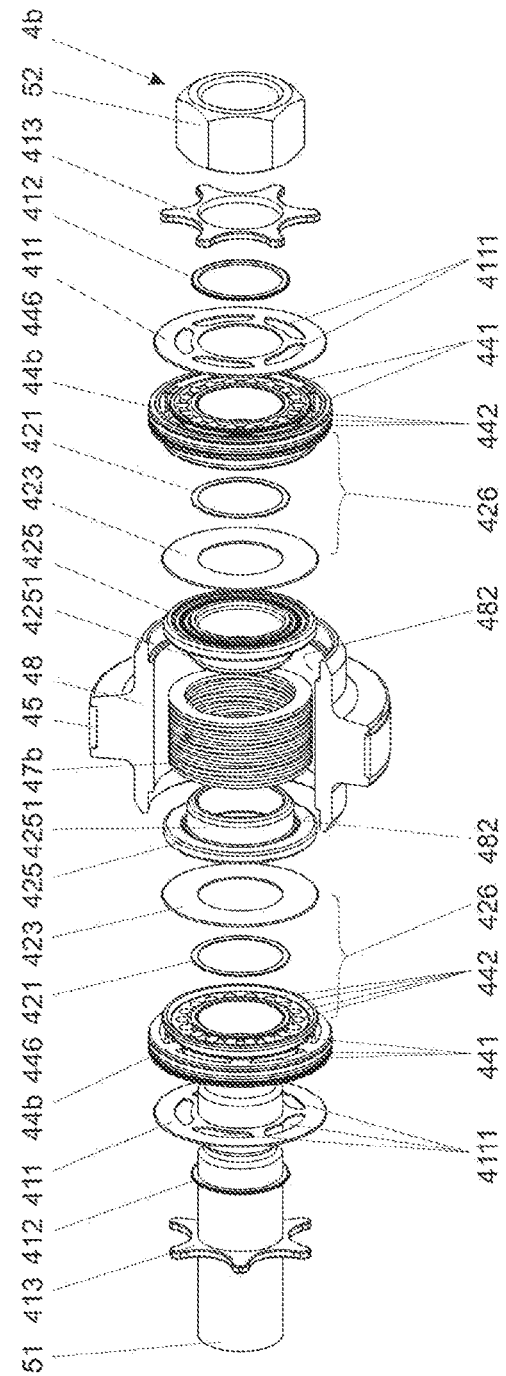

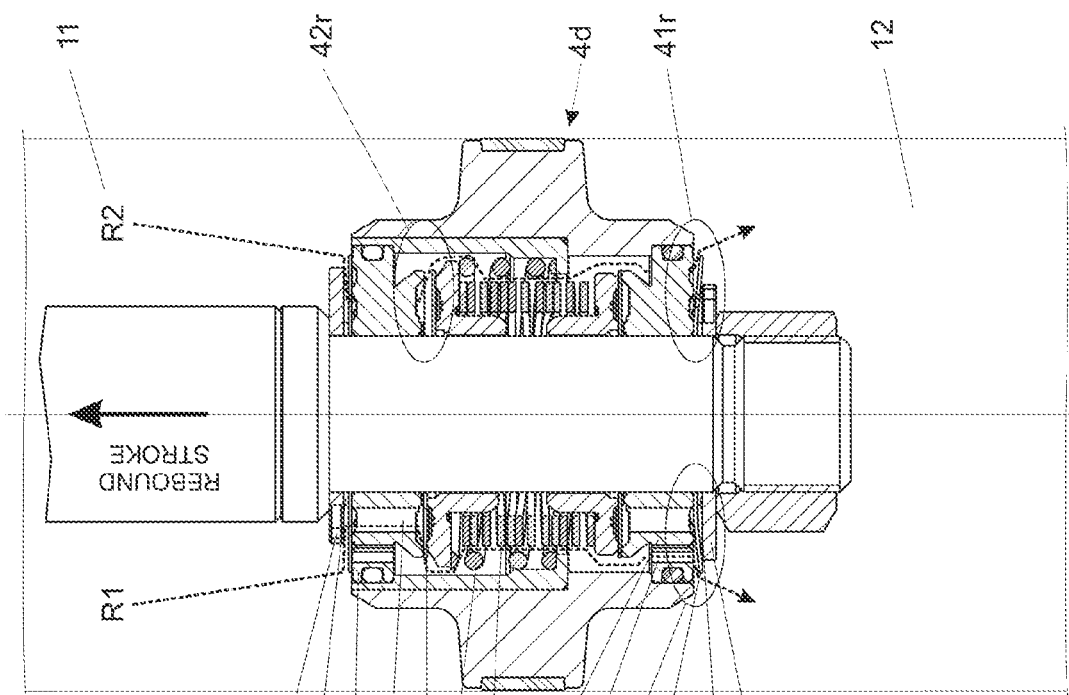
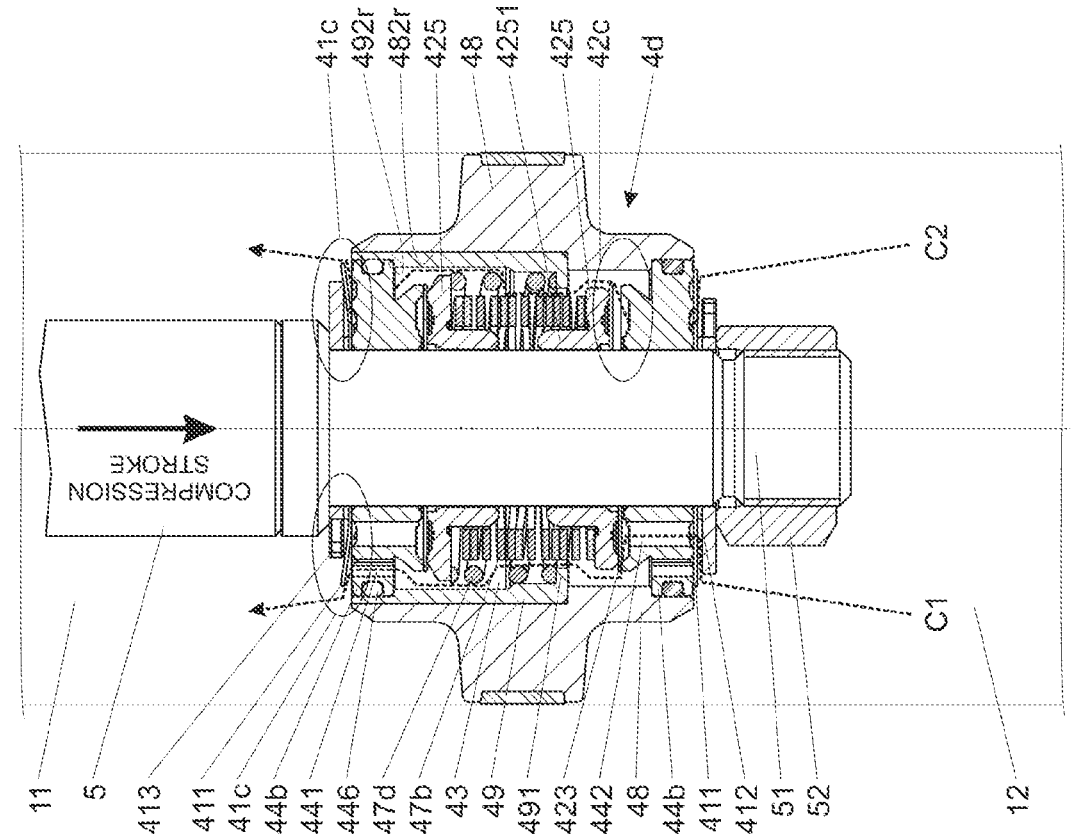
Fig. 7b
Fig. 7a

HYDRAULIC DAMPER WITH PISTON ASSEMBLY HAVING BLOW-OFF VALVES

CROSS-REFERENCE TO RELATED APPLICATIONS

This application claims priority to Chinese Patent Application No. 202110388034.2, filed on Apr. 12, 2021, which is hereby incorporated by reference in its entirety.

FIELD OF THE INVENTION

The invention relates to a hydraulic damper, in particular a motor vehicle hydraulic suspension damper, comprising: a tube filled with working liquid; a piston assembly disposed slidably inside the tube, dividing the tube into a rebound chamber and a compression chamber, the piston assembly including a rebound valve assembly and a compression valve assembly to control the flow of working liquid passing between the rebound chamber and the compression chamber, wherein each valve assembly comprises a deflectable-disc valve and a blow-off valve; and a piston rod attached to the piston assembly and extending outside the tube through a sealed piston rod guide.

BACKGROUND OF THE INVENTION

A piston assembly is a key component of a hydraulic damper and its construction and configuration has a major influence on a damper force vs. piston velocity characteristic during the damper compression and rebound stroke. It is therefore desirable to enable for shaping and tuning this force-velocity relation for each piston velocity range (low speed, medium speed, high speed) independently for each range and independently for the compression and for the rebound stroke, in order to improve safety and vehicle handling properties, reduce unwanted vibrations, improve passengers comfort, etc.

In deflectable-disc valves, a plurality of deflectable discs with predefined geometry and thickness are used to tune the damping characteristic in all piston velocity ranges. In a blow-off valve, a deflectable or displaceable closing element, usually in a form of a flat disc, is biased by a spring to keep the flow passages closed. After a certain pressure threshold is reached, the closing element compresses the spring, opening the flow passages. Various spring preloads are used to adjust damping characteristics of such a valve. The main advantage of a blow-off valve is its flat and digressive characteristic, so that driving a vehicle over curbs is smother.

Dampers having piston assemblies provided both with deflectable-disc type valves and blow-off valves are known e.g. from patent publications GB2314602, WO2005026572, US2002096408, KR20130139491, U.S. Pat. No. 5,823,306 or US2011031077.

Certain disadvantage in the process of manufacturing a piston assembly is a necessity of angular positioning of its components, which causes production and operation issues. Another disadvantage is the necessity of providing distinct components for the rebound and compression sides of a piston assembly.

It has been the object of the present invention to provide a hydraulic damper of a simple construction, which would be cost efficient, simple to manufacture, provide versatile damper tuning capabilities for different piston velocities, and would be devoid of the aforementioned disadvantages.

SUMMARY OF THE INVENTION

A damper of the kind mentioned in the outset, according to the present invention is characterised in that the piston assembly is provided with an internal chamber and comprises two sleeve-shaped members closing each side of said internal chamber, wherein each sleeve-shaped member is provided with a number blow-off valve flow passages, which are radially proximal, a plurality of deflectable-disc valve flow passages, which are radially distal, and a central opening, wherein the piston rod passes through said central openings in said sleeve-shaped members to secure the piston assembly, a plurality of deflectable disc(s) of the deflectable-disc valve cover(s) said radially distal flow passages of each sleeve-shaped member at its external side, wherein said deflectable disc(s) is/are provided with a plurality of radially proximal flow passages corresponding to said radially proximal flow passages of said sleeve-shaped member, and is/are axially fixed at the piston rod, a plurality of disc(s) of the blow-off valve adjoin(s) said radially proximal flow passages of each sleeve-shaped member at its internal side, wherein a flow channel fluidly connects said internal chamber with said radially proximal flow passages of each sleeve-shaped member, and the piston assembly further comprises two spring seats abutting said disc(s) of the blow-off valve, and at least one spring disposed within said internal chamber that biases said spring seats towards said number of disc(s).

Preferably, said sleeve-shaped members each include a cylindrical section that extends annularly around said internal chamber of the piston assembly, and wherein said piston assembly further includes an annular seal configured to seal between the cylindrical sections and the tube.

Alternatively preferably, the piston assembly further comprises a body defining said internal chamber of the piston assembly and is provided with an annular seal configured to seal against the tube.

Preferably, said at least one disc of the blow-off valve is deflectable or displaceable.

Preferably, said piston assembly further comprises at least one internal flange and said at least one spring disposed within said internal chamber is compressed between said internal flange and one of said spring seats and biases this seat towards said at least one number of disc.

In this case, preferably the piston assembly further comprises at least one insert disposed within said internal chamber and provided with said radially internal flange.

Also in this case, preferably the piston assembly further comprises at least one second spring disposed within said internal chamber and compressed between said internal flange and one of said spring seats, and biases this seat towards said number of disc(s).

Preferably, said internal chamber is cylindrical.

Preferably, said rebound valve assemblies and said compression valve assemblies are made of identical parts.

Preferably, said flow channel is defined by a plurality of radially external notches of at least one disc of the blow-off valve.

Alternatively or additionally, preferably said flow channel is defined by a space separating the at least one disc and said radially proximal flow passages of the blow-off valve.

If said cylindrical sections of said sleeve-shaped members define an annular gap therebetween, preferably the piston assembly further comprises an internal sleeve disposed within said internal chamber abutting an internal wall of each of said cylindrical sections and covering said annular gap.

Alternatively preferably, said annular seal includes a narrowed section defining an annular chamber between said annular seal and the main tube, said annular seal defining a plurality of radial openings that fluidly join said internal chamber of the piston assembly with said annular chamber to balance hydraulic pressure therebetween.

BRIEF DESCRIPTION OF DRAWINGS

The invention shall be described and explained below in connection with the attached drawings on which:

FIGS. 3a and 3b illustrates a piston assembly shown in FIG. 1 in an axonometric view (FIG. 3a), and an axial cross-sectional view (FIG. 3b), FIGS. 4a and 4b illustrates another embodiment of a piston assembly in an axonometric view (FIG. 4a), and an axial cross-sectional view (FIG. 4b);

FIGS. 6a and 6b illustrates a piston assembly shown in FIG. 4 in an exploded axial cross-sectional view (FIG. 6a) and an exploded axonometric view (FIG. 6b);

FIG. 7 illustrates yet another embodiment of a piston assembly in an axial cross-sectional view during the compression stroke (FIG. 7a) and during the rebound stroke (FIG. 7b);

DETAILED DESCRIPTION OF PREFERRED EMBODIMENTS

Figure 1:
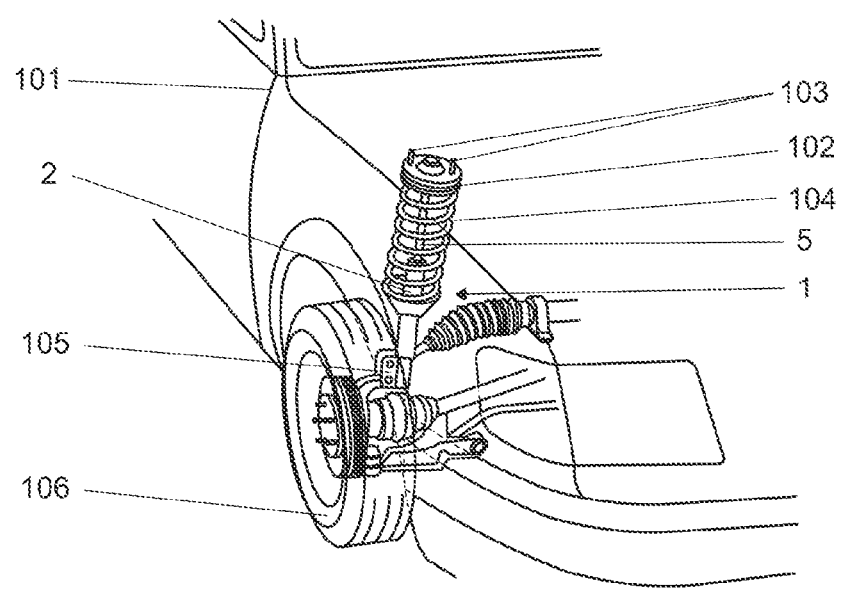
FIG. 1 illustrates a fragment of a vehicle suspension comprising the damper according to the present invention.

FIG. 1 schematically illustrates a fragment of an exemplary vehicle suspension comprising a damper 1 of the present invention attached to a vehicle chassis 101 by means of a top mount 102 and a plurality of screws 103 disposed on the periphery of the upper surface of the top mount 102. The top mount 102 is connected to a coil spring 104 and a piston rod 5 of the damper 1. The external tube 2 of the damper 1 is connected to the steering knuckle 105 supporting the vehicle wheel 106.

Figure 2:
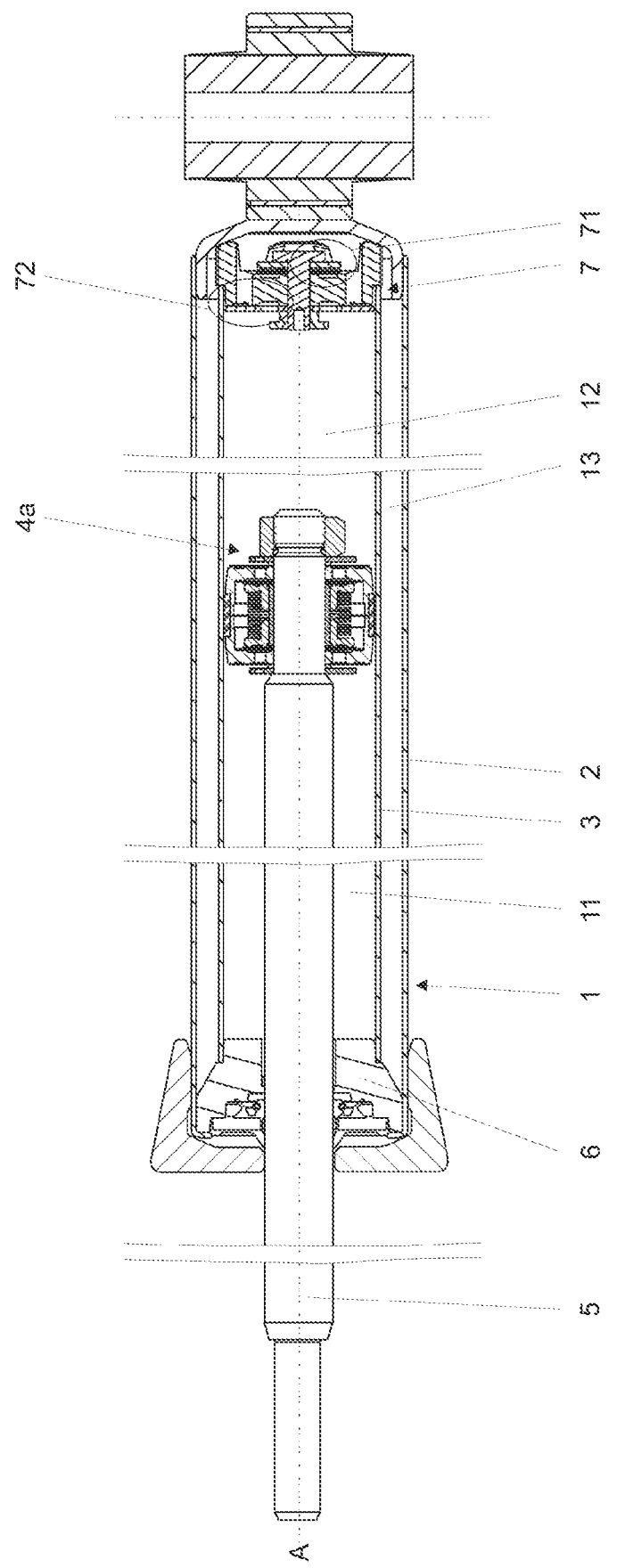
FIG. 2 is a schematic cross-sectional view of a twin-tube damper according to the present invention.
Figure 5A:
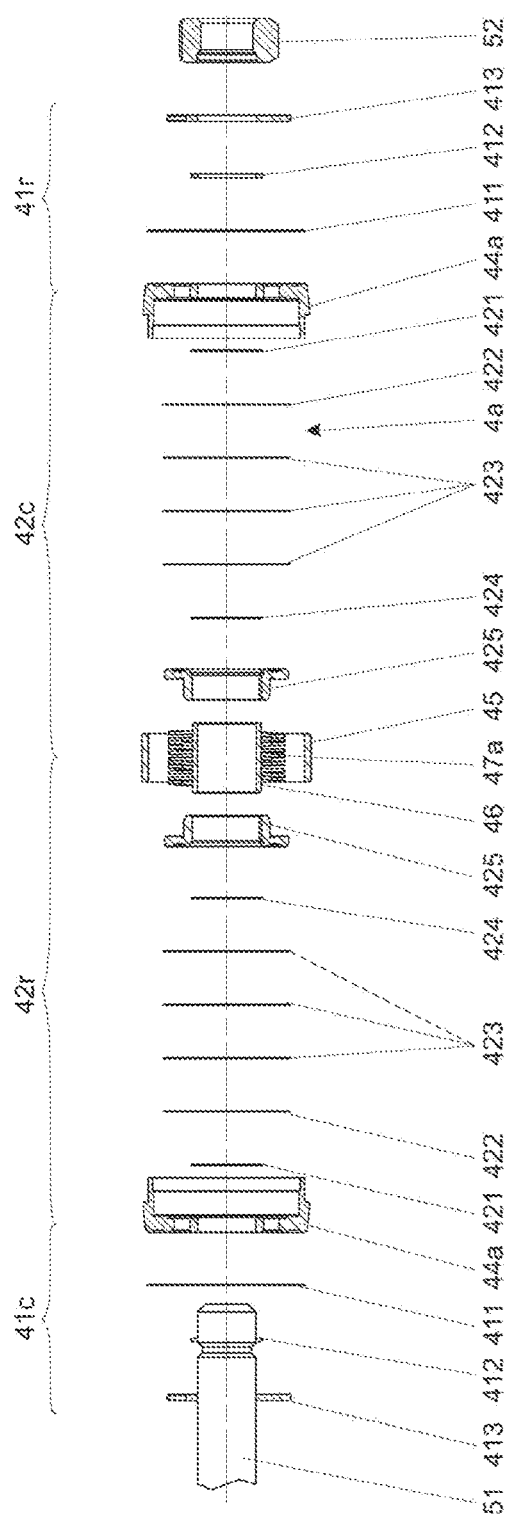
FIGS. 5a and 5b illustrates a piston assembly shown in FIG. 3 in an exploded axial cross-sectional view (FIG. 5a) and an exploded axonometric view (FIG. 5b)
Figure 5B:
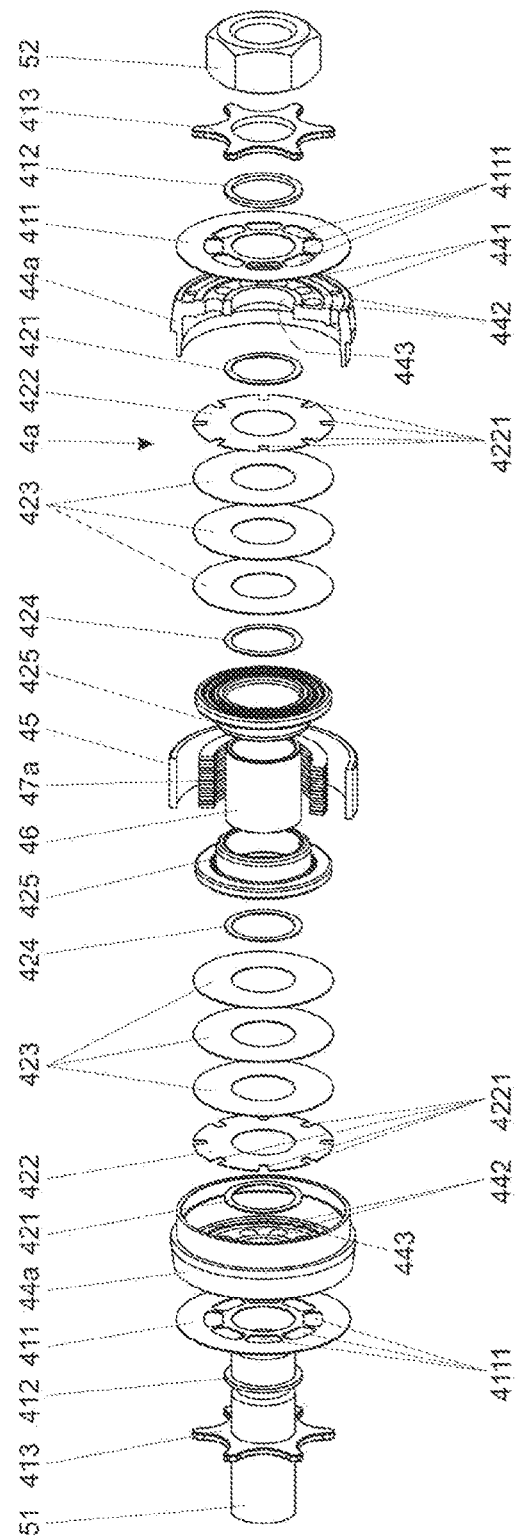

FIG. 2 presents an embodiment of a twin-tube damper 1 according to the present invention that may be employed in a typical motor vehicle suspension. The damper 1 comprises an external tube 2 and a main tube 3 filled with viscous working liquid inside of which a piston assembly 4a is attached to a piston rod 5. The piston rod 5 extends outside the main tube 3 through a sealed piston rod guide 6 is movably disposed along an axis A. The damper 1 is also provided with a base valve assembly 7 fixed at the other end of the main tube 3. The piston assembly 4a makes a sliding fit with the inner surface of the main tube 3 and divides the tube 3 into a rebound chamber 11 (between the piston rod guide 6 and the piston assembly 4a) and a compression chamber 12 (between the piston assembly 4a and the base valve assembly 7). An additional compensation chamber 13 is located at the other side of the base valve assembly 7.

The base valve assembly 7 is provided with compression 71 and rebound 72 valve assemblies to control the flow of working liquid passing between the compression chamber 12 and the compensation chamber 13 while the piston assembly 4a is in motion. Nonetheless, as shall be recognised by those skilled in the art from the following description, the invention is also applicable other damper constructions, including mono-tube dampers provided with a gas compensation chamber separated with a slidable diaphragm from the compression chamber 12.

The term "compression" as used herein with reference to particular elements of the damper refers to these elements or parts of elements which are adjacent to or face the compression chamber 12 or, in a case of working liquid flow direction, it refers to this flow direction that takes place during the compression stroke of the damper. Similarly the term "rebound" as used in this specification with reference to particular elements of the damper refers to these elements or these parts of particular elements which are adjacent to or face the rebound chamber 11 or, in a case of working liquid flow direction, it refers to this flow direction that takes place during the rebound stroke of the damper. Where appropriate suffixes "c" and "r" were added to numerical references in order to distinguish respectively compression and rebound side components of the piston assemblies according to the present invention. Otherwise numerical references to the same functional elements are the same throughout the drawings. Where appropriate, they are supplemented with additional suffixes ("a", "b", . . . ) to differentiate elements of the same functionality but different construction.

The piston assembly according to the present invention is provided with compression valve assemblies 41c, 42c and rebound valve assemblies 41r, 42r to control the flow of working liquid passing between the rebound chamber 11 and the compression chamber 12 while the piston assembly 4a is in motion. Each valve assembly 41, 42 includes a deflectable-disc valve 41 and a blow-off valve 42.

The embodiment of the piston assembly 4a, shown in FIGS. 2, 3a and 3b, and 5a and 3b, is symmetric with respect to the plane perpendicular to the axis A; compression valve assemblies 41c, 42c are mirror images of the rebound valve assemblies 41r, 42r and are made of the same components. This significantly simplifies the construction of the piston assembly 4a.

In this embodiment, the piston assembly 4a comprises two sleeve-shaped members 44a provided with central openings 443. A narrowed section 51 of the piston rod 5 passes through these openings 443 and a nut 52 is screwed on a threaded end of this narrowed section 51 securing the piston assembly 4a tightly to the piston rod 5. Each sleeve-shaped member 44a has a cylindrical section 444 and the cylindrical sections 444 of both sleeve-shaped members 44a face each other with a certain annular gap 447 (cf. FIGS. 9, 10) in between. A sleeve 46 adjoining the narrowed section 51 of the piston rod 5 provides support for the sleeve-shaped members 44a. An annular seal 45 is disposed radially outside of the sleeve-shaped member 44a and disposed within two adjoining annular groves 445 formed in the cylindrical sections 444, closing this annular gap and sealing against the main tube 3 with a sliding fit. Sleeve-shaped members 44a and the sleeve 46 of the piston rod 5 define an internal, substantially cylindrical chamber 43.

Each sleeve-shaped member 44a is provided with a plurality of blow-off valve flow passages 442 spaced at equal angular intervals, which are radially proximal, and a plurality of deflectable-disc valve flow passages 441 spaced at equal angular intervals, and which are radially distal.

The deflectable-disc valve 41 comprises a deflectable disc 411 that covers the radially distal flow passages 441 at the external side of the sleeve-shaped member 44a and is provided with a plurality of radially proximal flow passages 4111 corresponding to the blow-off valve flow passages 442 of the sleeve-shaped member 44a. The deflectable disc 411 is axially fixed at the narrowed section 51 of the piston rod 5 by means of a spacer 412 and a retainer 413.

The blow-off valve 42 comprises stack of discs formed by a spacer 421 adjoining the sleeve-shaped member 44a at its internal side, followed by a notched disc 422 provided with a plurality of radially external notches 4221 spaced at equal angular intervals, three discs 423 and a spacer 424. In this embodiment radially internal sides of the stacks of discs 422, 423 are clamped by the sleeve 46 to the sleeve-shaped members 44a. Each blow-off valve 42 further comprises a spring seat 425, also slidably disposed about the sleeve 46, which abuts the axially internal disc 423. A spring 47a disposed within the internal chamber 43 biases the spring seats 425 towards the discs 423 and 422 to cover the blow-off valve flow passages 442 in the sleeve-shaped member 44a.

During the piston assembly 4a operation the working liquid flows into the chamber 43 through radially proximal flow passages 4111 of the disc 411, blow-off valve flow passages 442 of the sleeve-shaped member 44a, and through a flow channel defined by the external notches 4221 in the notched disc 422 inside the chamber 43. Flowing out of the chamber 43 the working liquid enters into the deflectable-disc valve flow passages 441 of the sleeve-shaped member 44a on the opposite side of the chamber 43 and forces the disc 411 of the deflectable-disc valve 41 outside the chamber to deflect creating an annular gap restricting the flow and having the width increasing along with the pressure of the working liquid, until the point when the disc 411 abuts the retainer 413 and its further deflection is impossible.

After a certain piston velocity threshold is reached the pressure of the working liquid flowing into the chamber 43 will be higher than the pressure of the spring 47a and preload of the deflectable discs 422 and 423. At this point the spring seat 425 of the blow-off valve 42 will displace and the discs 423 and 422 will deflect toward the interior of the chamber creating an annular gap allowing more unrestricted flow of the working liquid. Therefore this velocity threshold is defined by the spring 47a constant and the elasticity of the stack of deflectable discs 422 and 423. This allows to control the characteristics of the blow-off valve to a much greater extent than it could be achieved with a blow-off valve with displaceable discs. Geometry of blow-off valve flow passages 442 in the sleeve-shaped member 44a determines the valve characteristics at the highest speeds of the piston rod 5.

Another embodiment of a piston assembly 4b is shown in FIGS. 4 and 6. This embodiment is also symmetric, similarly as in the embodiment of the piston assembly 4a, and the compression valve assemblies 41c, 42c are mirror images of the rebound valve assemblies 41r, 42r and are made of the same components.

The piston assembly 4b comprises a piston body 48 defining a cylindrical chamber 43. The piston body 48 is provided with an annular grove 481 in which an external annular seal 45 is disposed to seal against the main tube 3 with a sliding fit. The piston assembly 4b comprises two sleeve-shaped members 44b of a construction similar to sleeve-shaped members 44a of the piston assembly 4a. A narrowed section 51 of the piston rod 5 passes through central openings 443 of the sleeve-shaped members 44b and a nut 52 is screwed on a threaded end of this narrowed section 51 securing the piston assembly 4b to the piston rod 5. Each sleeve-shaped member 44b is disposed in an annular recess 482 provided in the piston body 48 at the end of the cylindrical chamber 43 and this connection is sealed with an annular o-ring seal 446. The deflectable disc valve 41 has the construction similar to the one discussed above with regard to the piston assembly 4a. The blow-off valve 42 comprises a spacer 421 adjoining the sleeve-shaped member 44b at its internal side, followed by a deflectable disc 423 and a spring seat 425 disposed slidably about the narrowed section 51 of the piston rod 5 and abutting the disc 423. A spring 47b disposed within the internal chamber 43 biases both spring seats 425 towards the disc 423 to cover the blow-off valve flow passages 442 in the sleeve-shaped members 44b. Spring seats 425 comprise cylindrical sections 4251 providing guidance for the spring 47b.

The piston assembly 4b operation is similar to the operation of the piston assembly 4a discussed above. In this embodiment, however, the working liquid flows into the chamber 43 through radially proximal flow passages 4111 of the disc 411, blow-off valve flow passages 442 of the sleeve-shaped member 44b, and through a flow channel 426 defined by the spacer 421 between the blow-off valve flow passages 442 and the disc 423.

Yet another embodiment of a piston assembly 4d is shown in FIGS. 7a and 7b. Similarly as in the embodiment of the piston assembly 4b the piston assembly 4d comprises a piston body 48 defining a cylindrical chamber 43 which is closed at the compression and at the rebound side with sleeve-shaped members 44b. In this embodiment the piston assembly 4d comprises an insert 49 disposed within an annular recess 482r of the piston assembly 4d at the rebound side of the cylindrical chamber 43 and at the rebound side of the cylindrical chamber 43 the sleeve-shaped member 44b is disposed within an annular recess 492r provided in the insert 49. The insert 49 has a radially internal flange 491 within the cylindrical chamber 43 that provides an abutment surface for an additional second spring 47d biasing a spring seat 425 of the rebound blow-off valve 42r along with a main spring 47b which is compressed between the spring seats 425 of the blow-off valves 42c and 42r. As shall be recognised by those skilled in the art another embodiment of the piston assembly (not shown) could be provided with two inserts 49 or without insert but with an internal flange by the piston assembly 4 itself (cf. FIG. 8).

FIGS. 7a and 7b illustrates the functionality of the piston assembly 4d during the compression stroke.

As shown in FIG. 7a (left side of the drawing), during the compression stroke, at low velocity of the piston assembly 4d, the working liquid flows via pathway C1 from the compression chamber 12 to the rebound chamber 11 through flow passages 4111 in the deflectable-disc 411, through blow-off valve flow passages 442 of the sleeve-shaped member 44b, through an annular gap between the blow-off valve disc 423 and the rebound side of the blow-off valve flow passages 442; through the cylindrical chamber 43; through the deflectable-disc valve flow passages 441 of the sleeve-shaped member 44b and its pressure forces the deflectable-disc 411 of the compression deflectable-disc valve 41c to deflect. Above a predefined velocity threshold, as shown in FIG. 7a (right side of the drawing), increased pressure of the working liquid in the compression chamber 12 lifts the spring seat 425 of the compression blow-off valve 42c against the pressure of the spring 47b opening additional pathway C2. This lowers the reaction force and provides digressive force vs. velocity characteristic of the damper.

As shown in FIG. 7b (left side of the drawing), during the rebound stroke, at low velocity of the piston assembly 4d, the working liquid flows via pathway R1 from the rebound chamber 11 to the compression chamber 12 through flow passages 4111 in the deflectable-disc 411, through blow-off valve flow passages 442 of the sleeve-shaped member 44b, through an annular gap between the blow-off valve disc 423 and the compression side of the blow-off valve flow passages 442; through the cylindrical chamber 43; through the deflectable-disc valve flow passages 441 of the sleeve-shaped member 44b and its pressure forces the deflectable-disc 411 of the rebound deflectable-disc valve 41r to deflect. Above a predefined velocity threshold, as shown in FIG. 7b (right side of the drawing), increased pressure of the working liquid in the re bound chamber 11 lifts the spring seat 425 of the rebound blow-off valve 42r against the pressure of both springs 47b and 47d opening additional pathway R2. This lowers the reaction force and provides digressive force vs. velocity characteristic of the damper. In this case the resultant spring constant of these two parallel springs 47b and 47d is the sum of their spring constants.

Figure 8:
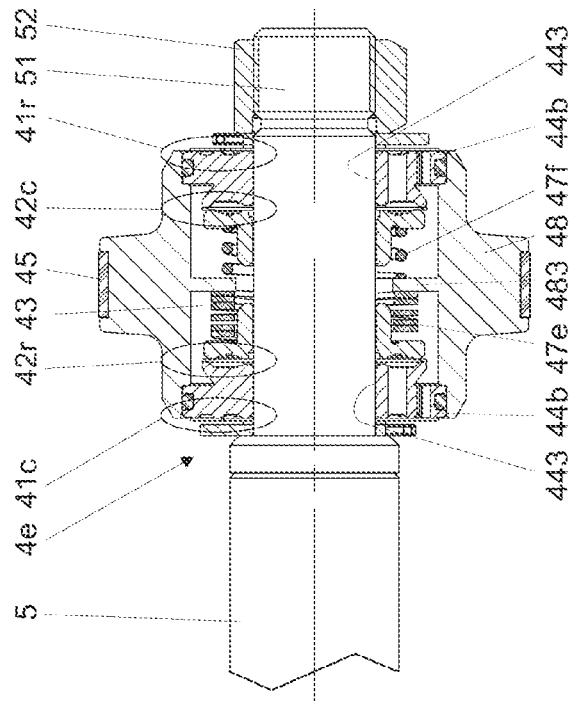
FIG. 8 illustrates yet another embodiment of a piston assembly in an axial cross-sectional view.

Yet another embodiment of a piston assembly 4e, shown in FIG. 8, has a construction similar to the piston assemblies 4b and 4d, wherein a piston body 48 is provided in a chamber 43 with a radially internal flange 483. A spring 47e is compressed between this internal flange 483 and a spring seat 425 of a rebound blow-off valve 42r. Another spring 47f is compressed between this internal flange 483 and a spring seat 425 of a compression blow-off valve 42c.

Figure 9:
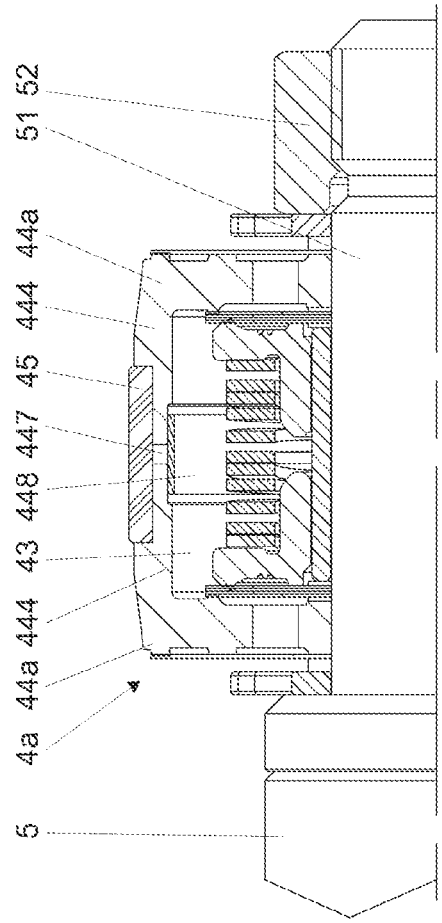
FIG. 9 illustrates an embodiment of a sealing arrangement of the piston assembly shown in FIGS. 2, 3a-3b, 5a and 5b.

As shown in FIG. 9 an annular gap 447 present between facing each other cylindrical sections 444 of both sleeve-shaped members 44a creates an opportunity for the working liquid to flow through this gap 447 and act with its pressure on an external annular seal 45 of the piston assembly 4a, leading to disadvantageous increase of friction.

To suppress this effect a sealing arrangement is provided in a form of a thin-walled internal sleeve 448 disposed within an internal chamber 43. The internal sleeve 448 abuts the internal wall of the cylindrical sections 444 of the sleeve-shaped members 44a and with a certain axial clearance covers the annular gap 447.

Figure 10:
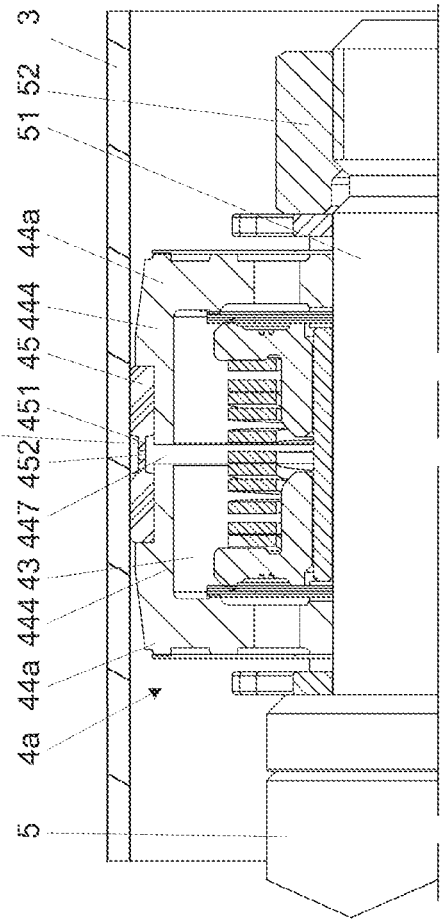
FIG. 10 illustrates another embodiment of a sealing arrangement of the piston assembly shown in FIGS. 2, 3a-3b, 5a and 5b.

Another form of a sealing arrangement is shown in FIG. 10. Here an annular seal 45 is provided with a narrowed section 451 in the middle defining an annular chamber 453 between the sealing 45 and the main tube 3. This narrowed section 451 is provided with a plurality of radial openings 452 spaced at equal angular intervals and which fluidly join an internal chamber 43 of the piston assembly 4a with the annular chamber 453 and balance hydraulic pressure therebetween.

The above embodiments of the present invention are therefore merely exemplary. The figures are not necessarily to scale, and some features may be exaggerated or minimized. These and other factors however should not be considered as limiting the spirit of the invention, the intended scope of protection of which is indicated in appended claims.

LIST OF REFERENCE NUMERALS 1. damper
11. rebound chamber
12. compression chamber
13. compensation chamber
2. external tube
3. main tube
4. piston assembly (4a, 4b, 4c)
41. deflectable-disc valve
   411. deflectable-disc
      4111. flow passage
   412. spacer
   413. retainer
42. blow-off valve
   421. spacer
   422. notched disc
      4221. notch
   423. disc
   424. spacer
   425. spring seat
      4251. cylindrical section
   426. flow channel
43. cylindrical chamber
44. sleeve-shaped member
   441. deflectable-disc valve flow passage
   442. blow-off valve flow passage
   443. central opening
   444. cylindrical section
   445. groove
   446. o-ring seal
   447. annular gap
   448. internal sleeve
45. seal
   451. narrowed section
   452. radial opening
46. sleeve
47. spring
48. piston body
   481. annular grove
   482. annular recess
   483. radially internal flange
49. insert
   491. radially internal flange
   492. annular recess
5. piston rod
51. narrowed section
52. nut
6. piston rod guide
7. base valve assembly
71. compression valve assembly
72. rebound valve assembly
101. vehicle chassis
102. top mount
103. screw
104. spring
105. steering knuckle
106. vehicle wheel

The invention claimed is:

1. A hydraulic damper (1), comprising:
a tube (3) filled with working liquid;
a piston assembly (4) disposed slidably inside the tube (3), dividing the tube (3) into a rebound chamber (11) and a compression chamber (12), the piston assembly including two sleeve-shaped members (44), a rebound valve assembly (41r, 42r), and a compression valve assembly (41c, 42c), wherein each of the rebound valve assembly (41r, 42r) and the compression valve assembly (41c, 42c) includes a deflectable-disc valve (41) and a blow-off valve (42);
an internal chamber (43) extending between the two sleeve-shaped members (44);

a piston rod (5) attached to the piston assembly (4) and extending outside the tube (3) through a sealed piston rod guide (6);

wherein each of the sleeve-shaped members (44) defines a plurality of blow-off valve flow passages (442), which are radially proximal, a plurality of deflectable-disc valve flow passages (441), which are radially distal, and a central opening (443), wherein the piston rod (5) passes through said central openings (443) in each of said sleeve-shaped members (44);

each of the deflectable-disc valves (41) including at least one deflectable disc (411) covering an external end of said deflectable-disc valve flow passages (441) of a corresponding one of said sleeve-shaped members (44);

wherein each of said at least one deflectable disc (411) is axially fixed at said piston rod and defines a plurality of radially proximal flow passages (4111) corresponding to said blow-off valve flow passages (442) of a corresponding one of said sleeve-shaped members (44);

each of the blow-off valves (42) including at least one disc (422, 423) adjoining an internal end of said blow-off valve flow passages (442) of a corresponding one of said sleeve-shaped members (44);

wherein a flow channel (4221, 426) fluidly connects said internal chamber (43) with said blow-off valve flow passages (442) of each sleeve-shaped members (44); and wherein the piston assembly (4) further comprises a spring seat (425) abutting said at least one disc (422, 423) of each of the blow-off valves (42), and at least one spring (47) disposed within said internal chamber (43) and configured to bias said spring seats (425) towards said at least one disc (422, 423).

2. The hydraulic damper according to claim 1, wherein said sleeve-shaped members (44) each include a cylindrical section (444) that extends annularly around said internal chamber (43) of the piston assembly (4a), and wherein said piston assembly (4) further includes an annular seal (45) configured to seal between the cylindrical sections (444) and the tube.

3. The hydraulic damper according to claim 1, wherein the piston assembly (4b, 4d, 4e) further comprises a body (48) defining said internal chamber (43) of the piston assembly (4b, 4d, 4e) and is provided with an annular seal (45) configured to seal against the tube.

4. The hydraulic damper according to claim 1, wherein said at least one disc (422, 423) of the blow-off valve (42) is deflectable or displaceable.

5. The hydraulic damper according to claim 1, wherein said piston assembly (4d, 4e) further comprises at least one internal flange (483, 491) and said at least one spring (47e, 47f) disposed within said internal chamber (23) is compressed between said internal flange (483, 491) and one of said spring seats (425) and biases said one of said spring seats (425) towards said at least one disc (422, 423).

6. The hydraulic damper according to claim 5, wherein the piston assembly (4d) further comprises at least one insert (49) disposed within said internal chamber (43) and including said at least one internal flange (491).

7. The hydraulic damper according to claim 5, wherein the piston assembly (4d) further comprises at least one second spring (47d) disposed within said internal chamber (43) and compressed between said internal flange (483, 491) and one of said spring seats (425), and biases said one of said spring seats (425) towards said at least one disc (422, 423).

8. The hydraulic damper according to claim 1, wherein said internal chamber (43) is cylindrical.

9. The hydraulic damper according to claim 1, wherein said rebound valve assemblies (41r, 42r) and said compression valve assemblies (41c, 42c) are made of identical parts.

10. The hydraulic damper according to claim 1, wherein said flow channel is defined by a plurality of radially external notches (4221) of the at least one disc (422, 423) of the blow-off valve (42).

11. The hydraulic damper according to claim 1, wherein said flow channel is defined by a space separating the at least one disc (422, 423) and said blow-off valve flow passages (442) of the blow-off valve (42).

12. The hydraulic damper according to claim 2, wherein said cylindrical sections (444) of said sleeve-shaped members (44a) define an annular gap (447) therebetween, and the piston assembly (4a) further comprises an internal sleeve (448) disposed within said internal chamber (43) abutting an internal wall of each of said cylindrical sections (444) and covering said annular gap (447).

13. The hydraulic damper according to claim 2, wherein said cylindrical sections (444) of said sleeve-shaped members (44a) define an annular gap (447) therebetween, and said annular seal (45) includes a narrowed section (451) defining an annular chamber (453) between said annular seal (45) and the tube (3), said annular seal (45) defining a plurality of radial openings (452) that fluidly join said internal chamber (43) of the piston assembly (4a) with said annular chamber (453) to balance hydraulic pressure therebetween.

14. The hydraulic damper according to claim 1, wherein the hydraulic damper is a motor vehicle hydraulic suspension damper.

* * * * *